(12) United States Patent
Bissontz (10) Patent No.: US 8,935,028 B2
(45) Date of Patent: Jan. 13, 2015

(54) ANGULAR VELOCITY CONTROL FOR HYBRID VEHICLE PRIME MOVERS

(75) Inventor: Jay E Bissontz, Ft. Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 3 days.

(21) Appl. No.: 13/581,531

(22) PCT Filed: Mar. 3, 2010

(86) PCT No.: PCT/US2010/026064
§ 371 (c)(1),
(2), (4) Date: Aug. 28, 2012

(87) PCT Pub. No.: WO2011/109018
PCT Pub. Date: Sep. 9, 2011

(65) Prior Publication Data
US 2012/0323428 A1    Dec. 20, 2012

(51) Int. Cl.
| | |
|---|---|
| *B60L 9/00* | (2006.01) |
| *B60W 10/06* | (2006.01) |
| *B60W 10/08* | (2006.01) |
| *B60W 10/30* | (2006.01) |
| *B60W 30/188* | (2012.01) |
| *B60W 20/00* | (2006.01) |

(52) U.S. Cl.
CPC ............. *B60W 10/06* (2013.01); *B60W 10/08* (2013.01); *B60W 10/30* (2013.01); *B60W 30/1886* (2013.01); *B60L 2240/423* (2013.01); *B60L 2240/443* (2013.01); *B60W 20/00* (2013.01); *B60W 2510/0661* (2013.01); *B60W 2510/0695* (2013.01); *B60W 2710/0672* (2013.01); *B60W 2710/085* (2013.01); *Y02T 10/6286* (2013.01); *Y02T 10/642* (2013.01); *Y10S 903/93* (2013.01)
USPC .............. 701/22; 180/65.265; 903/930

(58) Field of Classification Search
CPC ............... B60W 10/08; B60W 2510/0638; B60W 2540/16; B60W 10/06; B60W 20/00; B60W 10/30; B60W 2510/0604; B60W 2510/0628; B60W 2520/10; B60W 2540/10; B60W 2540/12; B60W 2710/0644
USPC ............... 701/22, 50; 180/65.265; 903/930
See application file for complete search history.

(56) References Cited

U.S. PATENT DOCUMENTS

| | | | |
|---|---|---|---|
| 5,971,888 A * | 10/1999 | Goode .................... | 477/107 |
| 6,021,370 A * | 2/2000 | Bellinger et al. .......... | 701/110 |
| 6,138,069 A | 10/2000 | Ellertson et al. | |
| 6,161,640 A * | 12/2000 | Yamaguchi ............. | 180/65.8 |
| 6,267,189 B1 * | 7/2001 | Nielsen et al. ........... | 180/53.1 |
| 6,692,395 B2 | 2/2004 | Rodeghiero et al. | |
| 6,922,997 B1 * | 8/2005 | Larson et al. ............ | 60/611 |
| 7,281,595 B2 | 10/2007 | Bissontz | |

(Continued)

*Primary Examiner* — Helal A Algahaim
*Assistant Examiner* — Shardul Patel
(74) *Attorney, Agent, or Firm* — Jeffrey P. Calfa; Mark C. Bach (57) ABSTRACT

An hybrid vehicle control system controls the output from one of two prime movers installed on the vehicle by reference to available angular acceleration rates for the first and second prime movers. When angular acceleration is called for and the prime mover having greater capacity for angular acceleration is active, acceleration is limited to that which would have been available from the lower capacity prime mover. One application of the system is to provide consistent throttle responsiveness, particularly for a power take-off operation vocation installed on the vehicle.

13 Claims, 4 Drawing Sheets

(56) References Cited

U.S. PATENT DOCUMENTS

| | | |
|---|---|---|
| 7,448,460 B2 | 11/2008 | Morrow et al. |
| 2002/0065171 A1* | 5/2002 | Raber ............................ 477/175 |
| 2005/0257968 A1* | 11/2005 | Egami .......................... 180/65.2 |
| 2006/0142913 A1* | 6/2006 | Coffee et al. ................... 701/35 |
| 2008/0177434 A1* | 7/2008 | Moran ............................ 701/22 |
| 2009/0095549 A1* | 4/2009 | Dalum et al. ............. 180/65.265 |
| 2009/0215586 A1* | 8/2009 | Kresse .......................... 477/110 |
| 2010/0219007 A1* | 9/2010 | Dalum et al. .............. 180/65.22 |
| 2012/0082570 A1* | 4/2012 | Schultz ......................... 417/212 |
| 2012/0207620 A1* | 8/2012 | Dalum et al. ................ 417/44.1 |

* cited by examiner

ANGULAR VELOCITY CONTROL FOR HYBRID VEHICLE PRIME MOVERS

BACKGROUND

1. Technical Field

The technical field relates generally to hybrid vehicles and, more particularly, to vehicles equipped with at least two prime movers and provides control over the response by the prime movers to requests for changes in power or angular velocity, particularly when in support of a power take-off operation (PTO).

2. Description of the Problem

Hybrid vehicles are generally equipped with at least two prime movers or systems capable of developing mechanical power. One prime mover is typically a thermal engine such as an internal combustion engine, although it is conceivable that a vehicle could be equipped with a gas turbine or a steam engine. This engine relies on combustion of a hydro-carbon fuel. The second prime mover frequently is a dual function system that can both develop mechanical power and can recapture vehicle kinetic energy during braking (regenerative braking). Recaptured energy can be stored in chemical, electrical or mechanical form. Electrical storage batteries exemplify storage of energy in chemical form. Capacitors store electrical energy. Fly wheels, springs and hydraulic accumulators exemplify methods for the storage of mechanical energy. The stored energy can be used directly or, more commonly, can be converted to a form which can be used to develop mechanical energy to propel the vehicle or to support subsidiary vehicle functions, such as PTO. In either case use of a vehicle thermal engine is reduced sparing fuel consumption.

Electric traction motors which can be back driven to generate electricity are a common second prime mover in hybrid vehicles. Electricity generated when back driven during regenerative braking may be used to charge batteries or it may be stored on capacitors. Alternative types of prime movers in common use are hydraulic or pneumatic pumps which can be back driven to build pressure in a hydraulic or pneumatic accumulator. A fly wheel represents combination of prime mover and storage means.

In a parallel type hybrid vehicle using first and second prime movers, either prime mover may be connected to drive the power take-off operation. However, the mechanical operating characteristics of the prime movers are likely to differ from one another. For example, at most operating speeds, an unloaded electrical motor will exhibit a greater capacity for angular acceleration than will a diesel cycle internal combustion engine. A diesel engine must draw air, compress the air and then convert the heated gas mixture to mechanical energy as the gas expands. The speed at which these events occur is limited. While, spark ignition engines generally respond somewhat more quickly to requests for increased power output than do diesel cycle engines, they suffer the same qualitative restrictions. Gas turbines generally respond less quickly to demands for increased power output than either compression or spark ignition engines due to the need for the exhaust turbine to spool up in speed before more air is delivered to the combustion chamber of the engine.

In contrast, an electric traction motor operates on currents and fields propagating at close to the speed of light. Friction and inertia affect both thermal engines and electric motors, but an electric motor can easily increase its angular velocity 200 to 400% faster than a diesel cycle internal combustion engine. The positive acceleration differences between an electric motor and a gas turbine are likely even greater than between an electric motor and a diesel cycle internal combustion engine. The percentage difference can vary depending upon how fast the respective devices were turning, or what their power output was, before the increase in power demand.

In contrast, any piston engine is likely to respond more quickly to a decrease in power demand than an electric motor or a turbine based engine. This is due to the inherent braking capacity engines of piston based pumps. Generally, under no load conditions, electric motors accelerate much more quickly than internal combustion engines but decelerate more slowly.

The differing capacity for angular acceleration and deceleration of the prime movers can affect the operation of PTO powered equipment. Hydraulic motion control equipment, capstans and the like may rely on a particular rate of change in angular velocity to implement proportional control. An example serves to illustrate this. A hydraulically operated aerial tower or equivalent device used to carry workmen or materials could be configured to operate with switch type devices mounted at an operator station. These are used to increase or decrease the angular velocity of the PTO system's integrated hydraulic pumps. If the primary movers exhibit differing angular acceleration than the PTO system will exhibit differing rates of unloaded acceleration for a given switch selection depending upon which prime mover is operative. The differences will be accentuated if an operation is spread over a shift in operation from one prime mover to the other.

SUMMARY

A consistent throttle response for a power take-off operation on a parallel hybrid vehicle is achieved regardless of which of two prime movers is supplying mechanical power. The system controls changes in the output from either two prime movers installed on the vehicle by reference to available angular acceleration, and possibly deceleration, rates for the first and second prime movers. When angular acceleration is called for the and the prime mover having greater capacity for angular acceleration is active its acceleration is limited to that which would have been available from the lower capacity prime mover. The system may be applied to vehicles having a power take-off operation to provide a consistent throttle response to a user when the power take-off operation is active. To further smooth throttle response throttle inputs may be subject to filtering using a finite impulse response filter to further adjust apparent throttle response. To implement this response control the finite impulse response filter has selectable weights, duration and granularity. Requests for a decreased target output from the first or second prime movers where the system is unloaded may match the available angular acceleration a selected one of the first or second prime movers.

DETAILED DESCRIPTION

In the following detailed description example sizes/models/values/ranges may be given with respect to specific embodiments but are not to be considered generally limiting.

Figure 1:
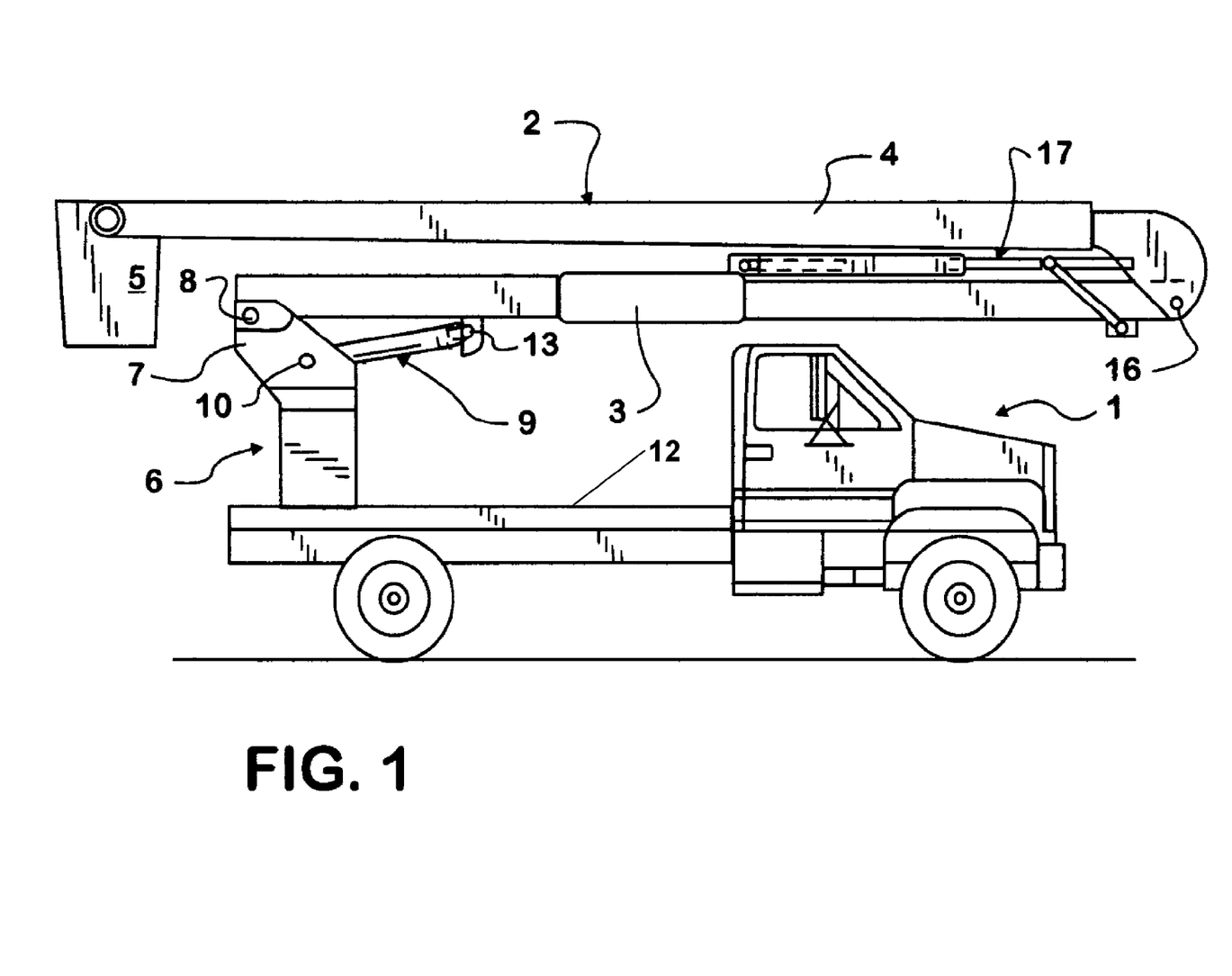
FIG. 1 is a side view of hybrid-electric vehicle carrying a power take-off operation.

Referring now to the figures and in particular to FIG. 1, a hybrid mobile aerial lift truck 1 is illustrated. Hybrid mobile aerial lift truck 1 serves as an example of a medium duty vehicle which supports a PTO vocation. The hybrid mobile aerial lift truck 1 includes a PTO load, here an aerial lift unit 2 mounted on a truck bed 12. Chassis inputs distributed around the hybrid mobile aerial lift truck 1 may be used to control deployment and positioning of the aerial lift unit 2 and other elements such as outriggers or drills for PTO. The operator will usually specifically activate PTO by use of a dedicated switch which may establish a controlling location.

The aerial lift unit 2 includes a lower boom 3 and an upper boom 4 pivotally interconnected to each other. The lower boom 3 is in turn mounted to rotate on the truck bed 12 on a support 6 and rotatable support bracket 7. The rotatable support bracket 7 includes a pivoting mount 8 for one end of lower boom 3. A bucket 5 is secured to the free end of upper boom 4 and supports personnel during lifting of the bucket to and support of the bucket within a work area. Bucket 5 is pivotally attached to the free end of boom 4 to maintain a horizontal orientation at all times. A hydraulic lifting unit 9 is interconnected between bracket 7 and the lower boom 3 by pivot connection 10 to the bracket 7 pivot 13 on the lower boom 3. Hydraulic lifting unit 9 is connected to a pressurized supply of a suitable hydraulic fluid, which allows the assembly to be lifted and lowered. The primary source of pressurized hydraulic fluid may be a separate pump powered by either of two prime movers for hybrid mobile aerial lift truck 1. Typically an internal combustion engine and an electric traction motor serve as the prime movers. The outer end of the lower boom 3 is interconnected to the lower and pivot end of the upper boom 4. A pivot 16 interconnects the outer end of the lower boom 3 to the pivot end of the upper boom 4. An upper boom compensating assembly 17 is connected between the lower boom 3 and the upper boom 4 for moving the upper boom about pivot 16 to position the upper boom relative to the lower boom 3. The upper-boom, compensating assembly 17 allows independent movement of the upper boom 4 relative to lower boom 3 and provides compensating motion between the booms to raise the upper boom with the lower boom. Upper boom compensating assembly 17 is usually supplied with pressurized hydraulic fluid from the same sources as hydraulic lifting unit 9. Outriggers (not shown) may be used installed at the corners of the truck bed 12.

Figure 2:
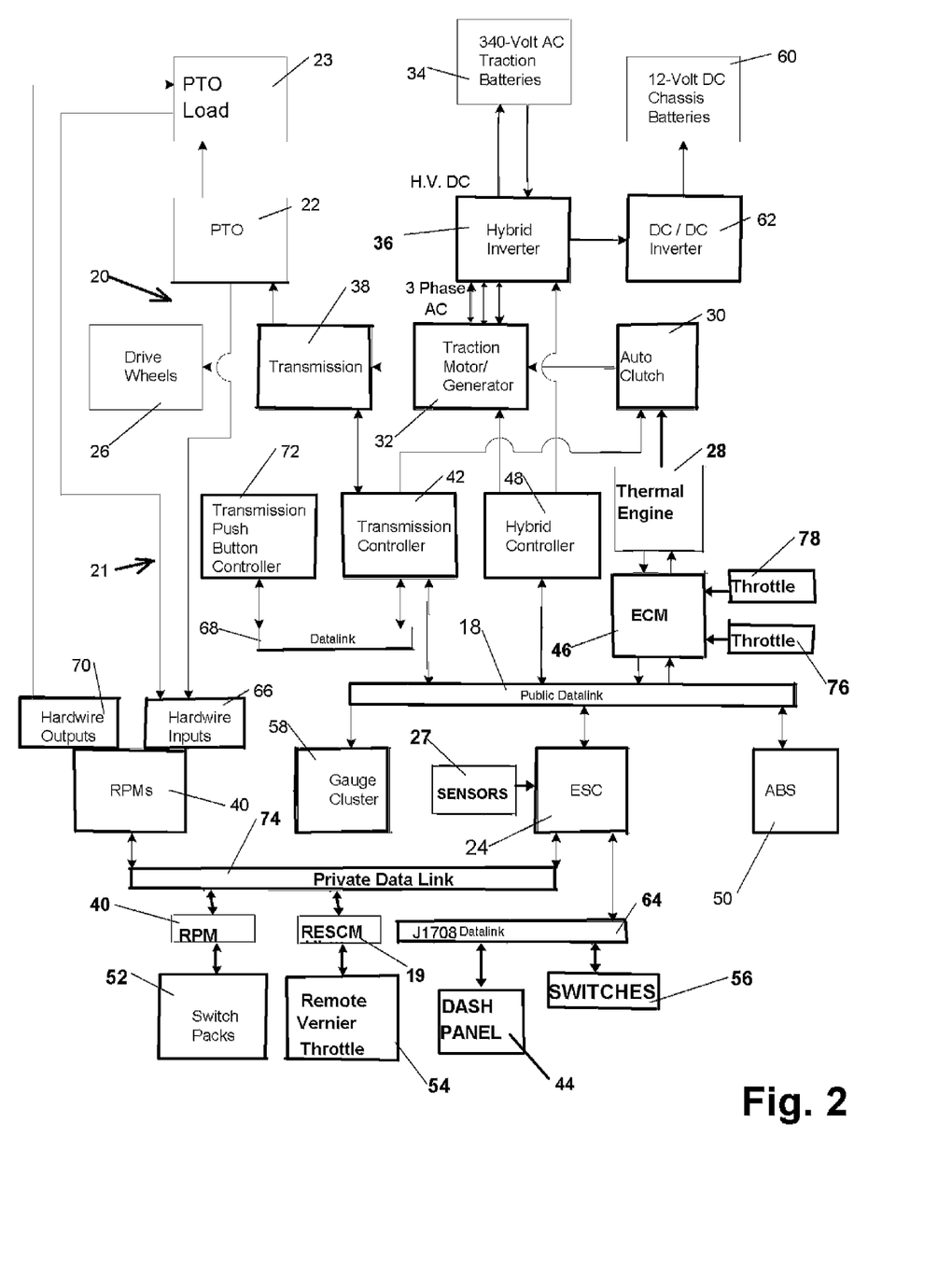
FIG. 2 is a high level schematic of a vehicle drive train and vehicle control system for a hybrid-electric vehicle.

Referring to FIG. 2, a high level schematic of a control system 21 which provides control over a vehicle drive train 20 such as may be used on hybrid mobile aerial lift truck 1 is illustrated. An electrical system controller (ESC) 24, a type of a body computer, operates as a system supervisor and is linked by a Society of Automotive Engineers (SAE) J1939 standard compliant public data link 18 to a variety of local controllers which in turn implement direct control over many vehicle functions not directly controlled by the ESC 24. As may be inferred, ESC 24 is typically directly connected to selected inputs (including sensors 27) and outputs (such as headlamp (not shown). ESC 24 communicates with a dash panel 44 from which it may obtain signals indicating headlight on/off switch position and provide on/off signals to other items, such as dash instruments (not shown). Ignition position is comprehended by a sensors package 27, directly connected to input ports of the ESC 24. Signals relating to activating power take-off operation (PTO), and changing the output level of the prime mover engaged to support PTO, may be generated from a number of sources, including an in-cab switch pack 56, an remote switch pack 52, a remote vernier throttle 54, an in-cab throttle 76 or a remote throttle 78. These signals may be communicated to ESC 24 or to the engine control module (ECM) 46 directly or over one of the vehicle data links, such as a SAE J1708 compliant data link 64 for switch pack 56 or SAE J1939 compliant data link 74 for switch pack 52 (through remote power module 40) and remote verier throttle 54 (through remote engine speed control module 19. SAE J1708 compliant data links exhibit a low baud rate data connection, typically about 9.7K baud and are typically used for transmission of on/off switch states. SAE J1939 compliant data links exhibit much higher data transmission rate and are commonly employed in controller area networks.

Five local controllers in addition to the ESC 24 are illustrated as connected to the public data link 18. These controllers include an engine controller 46, a transmission controller 42, a hybrid controller 48, a gauge controller 58 and an anti-lock brake system controller (ABS) 50. It will be understood that other controllers may be installed on the vehicle in communication with data link 18. These controllers both control various vehicle electrical loads and represent loads themselves. These additional controllers are represented by a generic "load" controller 17 for the control of loads 19. Various sensors may be connected to several of the local controllers. Data link 18 is preferably the bus for a public controller area network (CAN) conforming to the SAE J1939 standard and under current practice supports data transmission at up to 250K baud.

Hybrid controller 48, transmission controller 42 and engine controller 46 coordinate operations of the drive train 20 to select between the engine 28 and the traction motor 32 as the prime mover for the vehicle (or possibly to combine the output of the engine and the traction motor). During vehicle braking these same controllers coordinate disengagement and including potentially shutting down engine 28 and operation of traction motor 32 in its generation mode to recapture some of the vehicle's kinetic energy. The ESC 24 and the ABS controller 50 provide data over data link 18 used for these operations, including brake pedal position, data relating to skidding, throttle position and other power demands such as for PTO 22. The hybrid controller further monitors a proxy relating to battery 34 state of charge (SOC).

Drive train 20 may be a parallel hybrid diesel electric system in which the traction motor/generator 32 is connected in line with an engine 28 through an auto-clutch 30 so that the engine 28, the traction motor 32, or both in combination, can function as the vehicle's prime mover. In a parallel hybrid-electric vehicle the traction motor/generator 32 is used to recapture vehicle kinetic energy during deceleration by using the drive wheels 26 to back drive the traction motor/generator 32 thereby applying a portion of the vehicle's kinetic energy to the generation of electricity. The generated electricity is converted from three phase AC by the hybrid inverter 36 and applied to traction batteries 34 as direct current power. Some current may be diverted by DC/DC inverter 62 for maintaining the charge of a 12 volt DC chassis battery 60. In other words the system functions to recapture a vehicle's inertial momentum during braking and convert and store the recaptured energy as potential energy for later use, including reinsertion into the drive train 20. Engine 28 is disengaged from the other components in drive train 20 by opening auto-clutch 30 during periods when the traction motor/generator 32 is back driven.

Transitions between positive and negative traction motor 32 electrical power consumption are detected and managed by a hybrid controller 48. Traction motor/generator 32, during braking, generates three phase alternating current which is applied to an inverter 36 for conversion to direct current (DC) for application to traction battery plant battery 34. When the traction motor 32 is used as a vehicle prime mover the flow of power is reversed. Battery 34 is usually a lithium-ion battery plant.

High mass vehicles tend to exhibit poorer gains from hybrid locomotion than do automobiles. Thus electrical power available from traction battery 34 is often used to power other vehicle systems such as a PTO device 22, which may be a hydraulic pump, by supplying electrical power to the traction motor 32 which in turn provides the motive force or mechanical power used to operate the PTO device 22. In addition, traction motor/generator 32 may be used for starting engine 28.

The various local controllers may be programmed to respond to data from ESC 24 passed to data link 18. Hybrid controller 48 determines, based on available battery charge state, requests for power. Hybrid controller 48 with ESC 24 generates the appropriate signals for application to data link 18 for instructing the engine controller 46 to turn engine 28 on and off and, if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to a hydraulic pump which is part of PTO system 22 (or simply pressurized hydraulic fluid to PTO system 22 where transmission 38 serves as the hydraulic pump) or if the transmission is to be in neutral.

PTO 22 engagement and PTO load 23 control is implemented through one or more remote power modules (RPMs) 40. Remote power modules 40 are data linked expansion input/output modules dedicated to the ESC 24, which is programmed to utilize them. One RPM 40 functions as the controller for PTO 22, and provides any hardwire outputs 70 and hardwire inputs 66 associated with the PTO device 22. Position sensors, valve control and the like may also be provided a PTO load 23 which may include elements such as hydraulic motors, boom extensions, etc. Requests for operation of load 23 and, potentially, response reports are applied to the data link 74 for transmission to the ESC 24, which formats the request for receipt by specific controllers or as reports. ESC 24 is also programmed to control valve states through the first RPM 40 in PTO device 22. Remote power modules are more fully described in U.S. Pat. No. 6,272,402 which is assigned to the assignee of the present invention and is fully incorporated herein by reference. "Remote Power Modules" were referred to as "Remote Interface Modules" at the time. A second RPM 40 is illustrated which accepts switching inputs from a switch pack 52 for control of the first RPM 40 (after routing through ESC 24). In addition, a remote engine speed control module (RESCM) 19 is provided to allow proportional control over the hydraulic PTO using a remote vernier throttle 54.

Transmission controller and ESC 24 both operate as portals and/or translation devices between the various data links 68, 18, 74 and 64. Data links 68 and 74 may be proprietary and operate at substantially higher baud rates than does the public data link 18. Accordingly, buffering is provided for messages passed between data links. Additionally, a message may have to be reformatted, or a message on one link may require another type of message on the second link, e.g. a movement request over data link 74 may translate to a request for transmission engagement from ESC 24 to transmission controller 42. Data links 18, 68 and 74 are usually controller area network buses which conform to the SAE J1939 protocol.

The existing vehicle data link environment allows control over the operation of the vehicle's hybrid-electric drive train 20 and various loads represented by PTO 22, DC/DC inverter 62 and the various local controllers, for example the ABS controller 50. Implementation of load control is through a controller area network (CAN) communication strategy where different CAN modules/local controllers communicate over a data link environment (including data link 18) to control various chassis electrical loads (including PTO 22) and the various local controllers. This can include providing a consistent responsiveness to movement of throttles 76, 78 and 54 or switch set 56 during PTO notwithstanding which prime mover is active.

Figure 3:
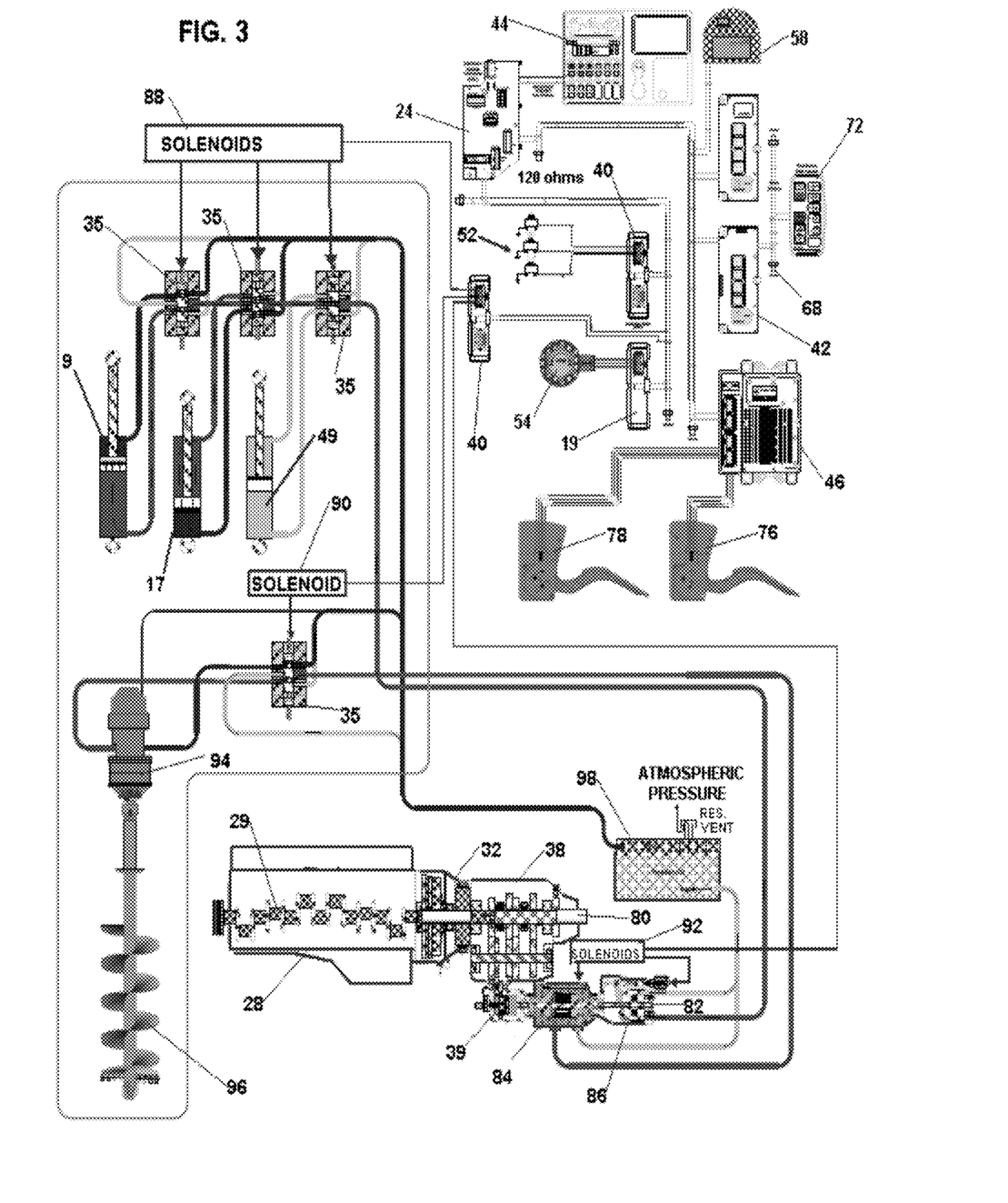
FIG. 3 is a more detailed schematic of a vehicle control system and power take-off operation for a hybrid-electric vehicle.

FIG. 3 further illustrates control relationships between the control system 21 of FIG. 2 and provides an example of a PTO 22 and PTO load 23. PTO load 23 may include a number of diverse elements, examples of which were illustrated in FIG. 1 such as hydraulic lifting unit 9 and upper boom compensating assembly 17. The PTO load of FIG. 3 includes three hydraulically driven piston in cylinder assemblies, including the hydraulic lifting unit 9, the upper boom compensating assembly 17, and a outrigger extension boom assembly unit 49. Control valves 35, which are opened and closed by solenoids 88, control the application of pressurized hydraulic fluid to these devices. The hydraulic fluid is pressurized by a hydraulic piston pump 86.

Another possible element of PTO load 23 is hydraulic motor 94 used to drive an auger 96. A hydraulic vane pump 84 supplies pressurized hydraulic fluid through control valve 35 to support operation of the hydraulic motor 94. Solenoid 90 controls positioning of control valve 35. A hydraulic fluid reservoir 98 is provided for return of fluid from the PTO loads 23 and from which the PTO 22 draws the hydraulic fluid. The hydraulic vane pump 84 and the hydraulic piston pump 86 are engaged and disengaged using another set of solenoids 92. The hydraulic vane pump 84 and the hydraulic piston pump 86 for a PTO 22 are driven off a common PTO shaft 82 from a transmission take-off 39. The details for a PTO load 23 and PTO 22 suggested by FIG. 3 are illustrative only and subject to considerable variation from what is shown, as is the hydraulic fluid distribution system.

Solenoids 88, 90 and 92 are controlled by RPM 40 which in turn is under the control of ESC 24. This allows hydraulic vane pump 84 and piston pump 86 to be disengaged so that PTO shaft 82 rotates freely, or, hydraulic vane pump 84 or piston pump 86 to be running in an unloaded condition, or either one to be loaded independently of the other.

Meeting requests for increased or decreased PTO angular speed are ultimately met by varying the operational/angular speed of the primary mover. Speed request data come from various devices. Here for example an in-cab throttle 76, a remote throttle (typically mounted outside the cab) 78, a remote vernier "hand" throttle 54 and discrete switches 52 are provided. Speed request data, and particularly data originating from one of the throttles, may be averaged over an adjustable number of points. Throttle data is handled in a first in, first out (FIFO) fashion with the oldest datum dropped with each in-coming new datum in an endless data acquisition loop. The data points may be weighted to reflect age or the average may be strictly linear. In effect, incoming throttle data is applied to a type of finite impulse response (FIR) linear filter implemented in software. The number of data points in a sampling window of fixed duration determines the resolution of the filter. Filter weighting can be used to determine the filter's "stiffness", or how fast the filter will change its output value with regards to the introduction of new data. The time duration of the sampling window may be fixed or variable, as may the number of data points used and the time lapse between samples. Sampling may be varied in response to operator actions, for example, if the operator behavior indicates rapidly changing output demands filter weighting may be adjusted to increase throttle sensitivity. Conversely, if operator behavior suggests steady power demands or vibration sensors indicate strong vehicle chassis movement filter weighting may be adjusted to reduce sensitivity and thereby increase noise tolerance in the power demand output value. All of this may be done automatically. The FIR filter outputs an absolute numeric value which is used by the prime movers as their target speed until such a time that the filter outputs a new value or "conditioned selected operating speed" which is the absolute numeric value for the prime movers to follow.

Figure 4:
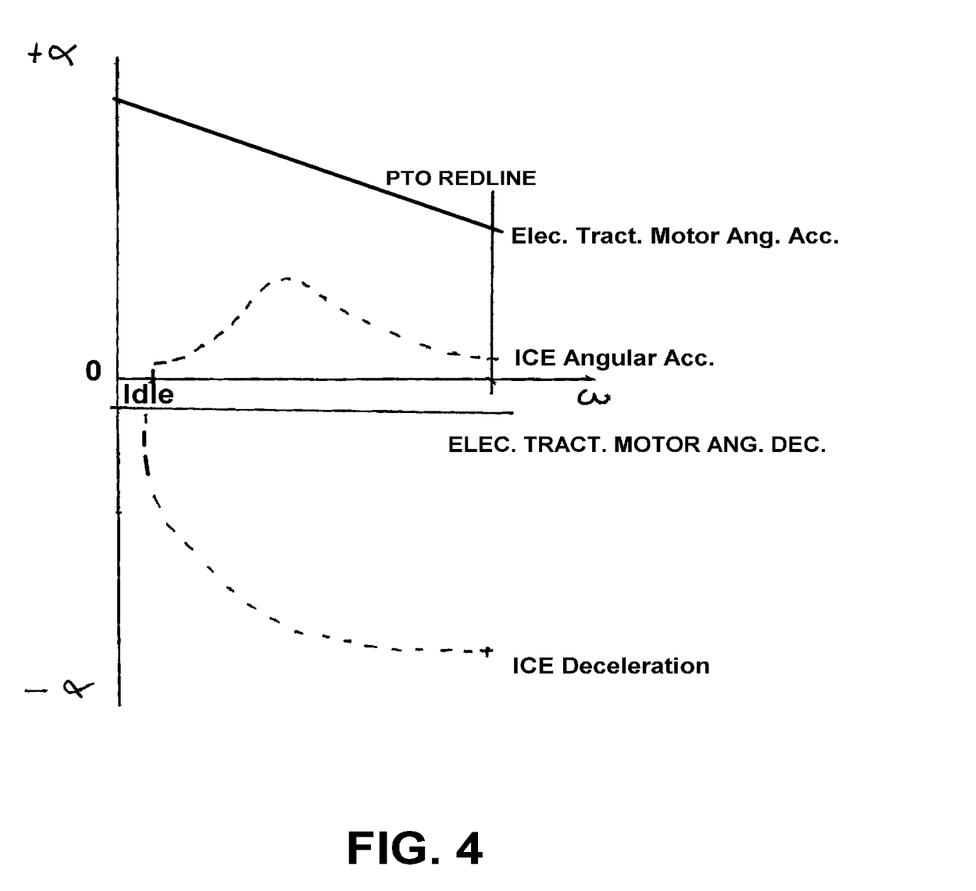
FIG. 4 is a graphical comparison of available acceleration and deceleration available from alternative prime movers for a hybrid-electric vehicle.

Changes in prime mover angular velocity ω are measured in terms of angular acceleration α. The available angular acceleration (or deceleration) depends upon which prime mover, the internal combustion engine 28 or electric fraction motor 32, will be used. In some applications the prime mover may be disconnected for deceleration. FIG. 4 compares available acceleration and deceleration capacity as a function of angular velocity for a compression ignition internal combustion engine and a three phase electric fraction motor under no load operating conditions. The three phase electric traction motor is illustrated as having greater acceleration capacity over all operating angular velocities up to the PTO redline. However, an electric traction motor provides relatively little braking capacity unless operating regeneratively, which may not be provided for during PTO. An internal combustion engine is however a natural brake and provides substantial compression braking if it remains connected to the PTO 22. This data may be generated and stored in a look up table which may be accessed by the ESC 24.

Typically the electric traction motor 32 will be operated during positive acceleration to mimic the output of the internal combustion engine 28. That is its acceleration will be limited to what the internal combustion engine 28 could have provided. In any event positive angular acceleration is limited to fall within the capacity of the slower accelerating prime mover. When reduced speed is requested a different target may be selected. Generally an internal combustion engine will decelerate more "quickly" than an electric fraction motor. Braking or regenerative braking may be used to mimic the deceleration effects of the internal combustion engine 28 during deceleration events commanded by a reduced throttle setting. Alternatively, the PTO load 23 may be active and may provide the desired braking without active intervention. Positive acceleration may be set or limited to fall below the capacity of the lower rated prime mover and the response may be fixed to follow any curve within that range. It is also possible that which prime mover has the greater capacity for angular acceleration may vary based on initial operating speed and may change as the system accelerates. It is also possible that the prime movers capacity for acceleration may change with use. The system may be programmed to account for declining capacity for angular acceleration, particularly on the part of the internal combustion engine.

What is claimed is:

1. A vehicle, comprising:
   a first prime mover;
   a second prime mover;
   a transmission coupled to absorb power from the first prime mover or the second prime mover;
   a power take-off operation selectively operable from the transmission;
   a control system operatively connected with the first prime mover, the second prime mover and the transmission for selecting an operating speed for the power take-off operation;
   the control system providing first and second available angular acceleration rates for the first and second prime movers as a function of angular velocity of the first and second prime movers for increases in operating speed of the power take-off operation; and
   the control system responding to a selection of increased operating speed for the power take-off operation by directing angular acceleration of an operable one of the first and second prime movers at no more than the lesser of the first and second available angular acceleration rates.

2. A vehicle as set forth in claim 1, further comprising:
   the control system providing first and second available angular deceleration rates for the first and second prime movers as a function of angular velocity of the first and second prime movers for decreases in operating speed of the power take-off operation; and
   the control system responding to a selection of increased operating speed for the power take-off operation being further responsive to selection of a reduced operating speed for the power take-off operation by directing angular deceleration of the operable one of the first and second prime movers at no less than the greater of the first and second available angular deceleration rates.

3. A vehicle as set forth in claim 1, further comprising:
   the control system responding to a selection of increased operating speed for the power take-off operation including a finite impulse response filter for operating on periodically generated data relating to selected operating speed to generate a conditioned selected operating speed.

4. A vehicle as set forth in claim 3, further comprising:
   the control system responding to a selection of increased operating speed for the power take-off operation providing for setting a sample window duration and sample time increment for the finite impulse response filter.

5. A vehicle as set forth in claim 4, further comprising:
   the control system responding to a selection of increased operating speed for the power take-off operation providing for adjusting weights applied to data points in the finite impulse response filter.

6. A vehicle as set forth in claim 3, further comprising:
   the first prime mover being an internal combustion engine; and
   the second prime mover being a electric traction motor.

7. A system for controlling output from at least one of first and second prime movers installed on a motor vehicle, the system comprising:
   a control system providing first and second available angular acceleration rates for the first and second prime movers as a function of angular velocity of the first and second prime movers;
   the control system selecting a target output from whichever prime mover is active;
   the control system responding to selection of an increased target output by setting angular acceleration of the active of the first or second prime movers to the lesser available angular acceleration for the first and second prime movers until the increased target output is met.

8. A system as set forth in claim 7, further comprising:
the first and second prime movers being an internal combustion engine and a electric traction motor, respectively; and
the control system responding to selection of an increased target output including an electrical system controller, a hybrid controller and an engine control module, the electrical system controller, hybrid controller and engine control module being coupled for communication of data.

9. A system as set forth in claim 8, further comprising:
a transmission operable from either the internal combustion engine or the electric traction motor;
a power take-off operation coupled to the transmission; and
the control system responding to selection of an increased target output being active responsive to activation of the power take-off operation.

10. A system as set forth in claim 9, further comprising:
the control system selecting a target output including an operator throttle.

11. A system as set forth in claim 10, further comprising:
the electrical system controller being programmed to implement a finite impulse response filter on data generated from position of the operator throttle.

12. A system as set forth in claim 11, further comprising:
the finite impulse response filter having selectable weights, duration and granularity.

13. A system as set forth in claim 9, further comprising:
the control system responsive to selection of a decreased target output for setting angular deceleration of the active of the first or second prime movers to the match the available angular acceleration for the first or second prime movers until the decreased target output is met.

* * * * *